United States Patent
Beck

(10) Patent No.: US 7,513,691 B2
(45) Date of Patent: Apr. 7, 2009

(54) PISTON ENGINE, SHAFT AND ROLLING BEARING FOR A PISTON ENGINE

(75) Inventor: Josef Beck, Villingen-Schwenningen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 342 days.

(21) Appl. No.: 10/583,004

(22) PCT Filed: Oct. 13, 2004

(86) PCT No.: PCT/EP2004/011501

§ 371 (c)(1),
(2), (4) Date: Jun. 15, 2006

(87) PCT Pub. No.: WO2005/064158

PCT Pub. Date: Jul. 14, 2005

(65) Prior Publication Data

US 2007/0144466 A1    Jun. 28, 2007

(30) Foreign Application Priority Data

Dec. 19, 2003  (DE)  ............................ 103 60 003

(51) Int. Cl.
*F16C 33/58* (2006.01)
*F16C 33/36* (2006.01)
(52) U.S. Cl. ........................ 384/513; 384/543; 384/548

(58) Field of Classification Search ................. 384/202, 384/454, 513, 517–518, 535–538, 558, 569–571, 384/543, 546, 548; 74/569, 567; 242/321
See application file for complete search history.

(56) References Cited

U.S. PATENT DOCUMENTS

| | | | | | |
|---|---|---|---|---|---|
| 2,397,703 | A | * | 4/1946 | Stallman | 384/538 |
| 2,659,637 | A | * | 11/1953 | Barr | 384/558 |
| 2,947,196 | A | * | 8/1960 | Van Dorn et al. | 74/569 |
| 2,982,587 | A | * | 5/1961 | Fraser et al. | 384/454 |
| 3,804,562 | A | * | 4/1974 | Hansson | 384/517 |
| 3,868,151 | A | * | 2/1975 | Derner | 384/569 |

(Continued)

FOREIGN PATENT DOCUMENTS

DE    24 39 334 A1    8/1974

(Continued)

*Primary Examiner*—Marcus Charles
(74) *Attorney, Agent, or Firm*—Scully, Scott, Murphy & Presser, P.C.

(57) ABSTRACT

Piston engine with a housing in which a shaft (19) is rotatably mounted in two pivot bearings of which at least one pivot bearing has an inner ring (26a) which is seated without radial clearance of motion on a supporting region (28) of a bearing section (19c) of said shaft (19). In order to prolong the working life of the at least one pivot bearing, the axial length of the supporting region (28) corresponds to a central region (a) of the bearing section (19c), a radial clearance of motion being disposed, at the two outer regions (b, c), between said outer regions (b, c) and the inner ring (26a).

8 Claims, 2 Drawing Sheets

U.S. PATENT DOCUMENTS

| | | | | |
|---|---|---|---|---|
| 3,969,029 A | * | 7/1976 | Schaeffler | 384/202 |
| 4,699,528 A | * | 10/1987 | Gotman | 384/536 |
| 4,899,863 A | * | 2/1990 | Settles | 192/110 R |
| 5,552,650 A | * | 9/1996 | Cap et al. | 310/67 R |
| 6,540,406 B1 | * | 4/2003 | Matsuoka | 384/517 |
| 6,848,642 B2 | * | 2/2005 | Hitomi | 242/321 |
| 2002/0097938 A1 | * | 7/2002 | Muraki et al. | 384/513 |
| 2003/0048965 A1 | | 3/2003 | Miyazaki et al. | |
| 2003/0111569 A1 | * | 6/2003 | Hitomi | 242/321 |

FOREIGN PATENT DOCUMENTS

| | | |
|---|---|---|
| DE | 24 50 580 A1 | 10/1974 |
| DE | 198 24 128 A1 | 5/1988 |
| DE | 102 20 610 A1 | 5/2002 |
| EP | 0 324 324 A1 | 7/1989 |
| GB | 395886 | 7/1933 |
| GB | 1127975 | 9/1968 |

* cited by examiner

PISTON ENGINE, SHAFT AND ROLLING BEARING FOR A PISTON ENGINE

BACKGROUND OF THE INVENTION

1. Field of the Invention

The invention relates to a piston engine.

During the functional operation of a piston engine, there are fed into the shaft of the piston engine transverse forces which result from the forces of the piston and which tend to bend the shaft. The shaft and at least two appertaining pivot bearings therefore have to be constructed in a sufficiently robust manner. In spite of a robust construction and mounting of the shaft, bending of the latter occurs because of the elasticity of the material, a fact which leads to inclined positions of the shaft in the region of the bearing sections and that is particularly the case when the bearing sections are at an axial distance from one another. In the case of axial piston engines, in particular, this distance is relatively great and is determined by the axial dimensions of a cylinder block and a drive disc.

2. Discussion of the Prior Art

On the subject of the technological background, reference should be made to DE 102 20 610 A1, for example, with regard to a plain pivot bearing in an axial piston engine. Because of deflection and the resulting inclined position of the relevant bearing section in the region of the pivot bearing, an inclined position of the bearing ring in the pivot bearing also automatically occurs, a fact which leads not only to jamming effects in the pivot bearing but also to one-sided loadings with correspondingly high surface pressures (so-called "edge runners"). As a result of this, the bearing surfaces are subjected to higher loads, a fact which leads to higher wear and to a reduction in the working life of the pivot bearings.

In piston engines, it is customary for the pivot bearings to be constituted by plain bearings or rolling bearings. Under these circumstances, it is likewise customary for the relevant bearing section of the shaft to be constituted by a cylindrical bearing section, on which a hollow-cylindrical bearing sleeve is seated with a fit without radial clearance of motion.

SUMMARY OF THE INVENTION

The underlying object of the invention is to configure a piston engine or a shaft or an inner bearing ring for mounting the shaft in the piston engine, in such a way that the working life of the relevant pivot bearing is prolonged.

In the piston engine according to the invention, the axial length of the supporting region is shortened to a central region of the bearing section, and radial play is present between the bearing section and the inner bearing ring in the two outer regions next to the supporting region.

In a configuration according to the invention, the axial length of the supporting region is shortened to a central region of the bearing section, the bearing section having a greater diameter in its axial central region than in its outer regions.

In another configuration according to the invention, the axial length of the supporting region is shortened to a central region of the inner bearing ring, and the bearing ring has a diameter, in the two outer regions next to the supporting region, which is smaller than in the outer regions.

The configurations according to the invention lead to the fact that, when the shaft and/or the inner bearing ring is/are in the assembled condition, a radial clearance of motion is present in the outer regions between the bearing section and the bearing ring, while a central region of the bearing section and of the bearing ring fulfils the necessary supporting function. Because of the radial clearance of motion in the outer regions there are present, on both sides of the shortened supporting region, clearances into which the bearing section is able to move in the event of deflection of the shaft, without radial compression stresses occurring in the end regions of said bearing section. Consequently, the jamming effects and elevated surface pressures which arise in the case of the prior art are also avoided, and the wear of the pivot bearing is reduced and its working life increased.

The bearing section also moves into the clearances present on both sides, when the inner bearing ring is fitted onto the driving shaft in the heated-up condition with over-dimensioning.

The length of the shortened supporting region may amount to about ¼ to ½, and in particular to about ⅓, of the length of the bearing section or bearing ring. Tests have shown that these dimensional ranges lead, on the one hand, to a sufficiently large supporting region and, on the other hand, to sufficiently large clearances on both sides of the supporting region. The supporting region itself may be of cylindrical construction on its superficies.

On the bearing section, the outer regions may be constituted by longitudinal regions of the relevant bearing section which are step-shaped or continuously narrowed towards the outside. In comparable manner, the outer regions on the bearing ring may be constituted by widened portions that diverge in a step-shaped manner or towards the ends of the bearing ring.

The configurations according to the invention are suitable both for a plain bearing and also for a rolling bearing. In both cases, the supporting force of the bearing is transmitted, via the inner bearing ring, to the supporting region of the bearing section or of the bearing ring, or vice versa. The configurations according to the invention are particularly highly suitable for a needle bearing in which the radial bearing play is particularly low and therefore even small deflections of the shaft lead to the loadings on the pivot bearing which have been described above. It should also be emphasized that rolling bearings are particularly sensitive to radial jamming effects and pressure peaks because of the small size of the running surfaces.

BRIEF DESCRIPTION OF THE DRAWINGS

Advantageous configurations of the invention will be explained in greater detail below with the aid of preferred exemplified embodiments and drawings. In the latter:

FIG. 4 shows the bearing section according to FIG. 3 with an inner bearing ring pushed on.

DETAILED DESCRIPTION OF THE INVENTION

Figure 1:
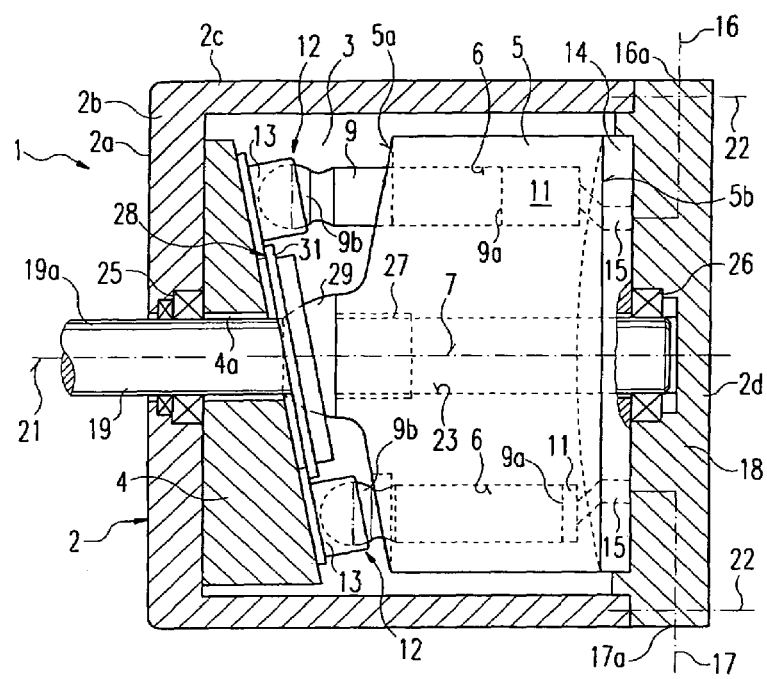
FIG. 1 shows an axial piston engine according to the invention, in axial section.

The exemplary piston engine, which is designated, as a whole, by 1, has a housing 2 in whose interior 3 a swash plate 4 and a cylindrical drum 5 are disposed side by side. Disposed in the cylindrical drum 5, in a manner distributed uniformly over the periphery, are piston holes 6 which, in the present exemplified embodiment of an axial piston engine, extend substantially parallel to a central axis 7 of the cylindrical drum 5 and are open on that end face 5a of the cylindrical drum 5 which faces towards the swash plate 4. Mounted in a substantially axially displaceable manner in the piston holes 6 are pistons 9 which are preferably cylindrical and which, with their piston heads 9a, delimit working chambers 11 in the cylindrical drum 5 in the direction of the swash plate 4. The foot ends 9b of the pistons 9, which foot end face towards the swash plate 4, are each supported on the latter by a joint 12, under which circumstances sliding blocks 13 may be present, between which blocks and the foot ends 9b are disposed the joints 12, which are preferably constructed as ball joints 12 with a spherical head and a spherical recess.

The cylindrical drum 5 rests, with its end face 5b that faces away from the swash plate 4, against a control disc 14 in which two control apertures 15 in the form of through-holes are disposed, which constitute sections of a diagrammatically indicated supply line 16 and a discharge line 17, which lines extend through an adjoining housing wall 18 on which the control disc 14 is held. The cylindrical drum 5 is mounted on a drive shaft 19 which is rotatably mounted in the housing 2 and whose axis of rotation 21 extends coaxially in relation to the central axis 7.

In the present exemplified embodiment, the housing 2 is formed from a pot-shaped housing part 2a with a housing bottom 2b and a peripheral wall 2c, and also a cover 2d which constitutes the housing wall 18 and which rests against the free edge of said peripheral wall 2c and is screwed to the latter by screws which are represented in a diagrammatic manner. Line connections 16a, 17a are provided on the cover 2d for the purpose of connecting the onward-going supply and discharge lines 16, 17.

The drive shaft 19, which passes through the cylindrical drum 5 in a bearing bore 23, is rotatably mounted and sealed in bearing recesses in the housing bottom 2b and the cover 2d by means of suitable pivot bearings 25, 26, for the shaft passing axially through the housing bottom 2b and protruding from the latter with a drive pin 19a.

In the present exemplified embodiment of the piston engine 1 as a swash-plate engine, the cylindrical drum 5 is disposed in a non-rotatable manner on the drive shaft 19 by means of a rotary-entrainment connection 27, for example a toothed clutch, the drive shaft passing through the swash plate 4, which is disposed fixedly on the housing bottom 2 or constructed therein, in a through-hole 4a. In the present exemplified embodiment, the cylindrical drum 5 rotates, when in functional operation, relative to the swash plate 4, the pistons 9 being displaced longitudinally in the direction of the working chambers 11 and back.

Figure 2:
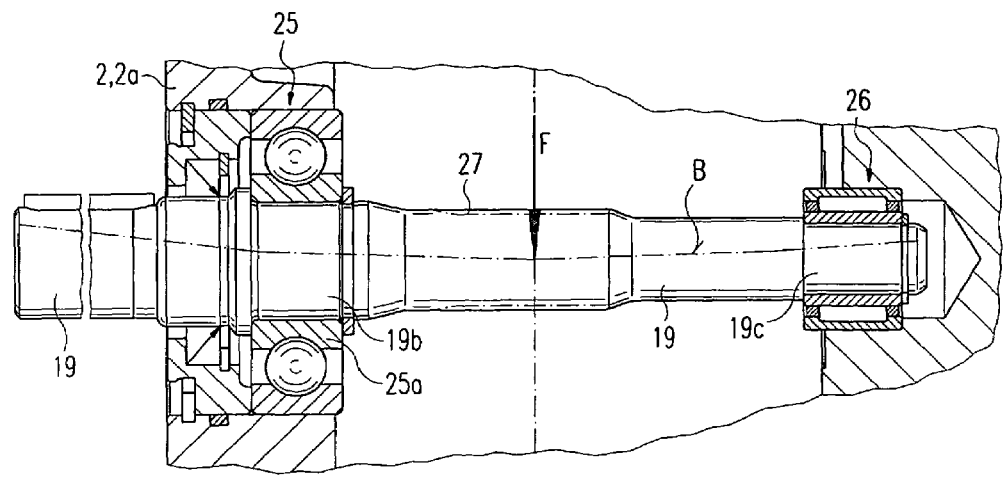
FIG. 2 shows a bearing region of a drive shaft of the axial piston engine, in side view.

In the exemplified embodiment according to FIG. 2, the pivot bearing 25 in the housing bottom 2a is constituted by a rolling bearing, for example a ball bearing, and the pivot bearing 26 in the cover 2d by a rolling bearing, in particular a needle bearing.

Figure 3:
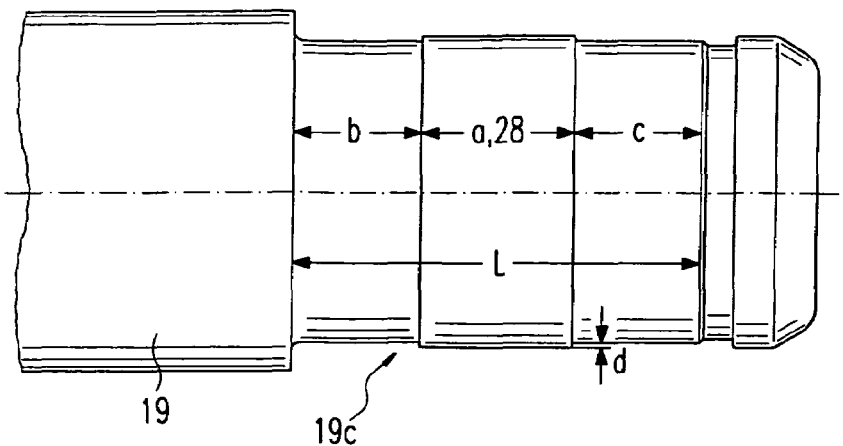
FIG. 3 shows a bearing section of the drive shaft, in side view.

The bearing sections of the drive shaft 19 which carry the inner bearing rings 25a, 26a are designated by 19b, 19c. Within the scope of the invention, one of the two pivot bearings 25, 26 or both the pivot bearings 25, 26 may be constructed in the manner which will be described below with the aid of FIGS. 3 to 5 in the case of the pivot bearing 26 in the cover 2d.

In the configuration according to the invention, the bearing section 19c is narrowed in cross-section on both sides of a central section a. These outer regions which are located next to the central section a are designated by b and c. The narrowed portion may be one which is step-shaped or one which extends in a manner converging towards the particular end of the bearing section 19c. In the present exemplified embodiment, the outer regions b, c are cylindrical outer regions b, c which are narrowed in a step-shaped manner. The central section is preferably likewise of cylindrical construction. It constitutes a supporting region 28 for the inner bearing ring 26a. Compared with known configurations, said supporting region 28 is axially shortened to the central region a, and is, for example, of cylindrical construction. The axial size of the supporting region 28 amounts to about ¼ to ¾, and preferably ⅓, of the length L of the bearing section 19c. The radial dimension d of the narrowed portion amounts to 0.05 mm, at least in the end region of the outer regions b, c.

In the supporting region 28, the bearing ring 26a is seated on the bearing section 19c with a fit without radial play, which fit is customary for the inner bearing rings of rolling bearings. Because of the radial clearance of motion, annular clearances 29a, 29b are present between the narrowed superficies of the outer regions b, c and the cylindrical inner superficies of the bearing ring 26a. In the event of bending B, which is represented in a diagrammatic manner in FIG. 2, of the drive shaft 19, the end regions of the relevant bearing section 19c are able to dip into the clearances 29a, 29b without exerting jamming effects and compression stresses on the bearing ring 27a.

Figure 4:
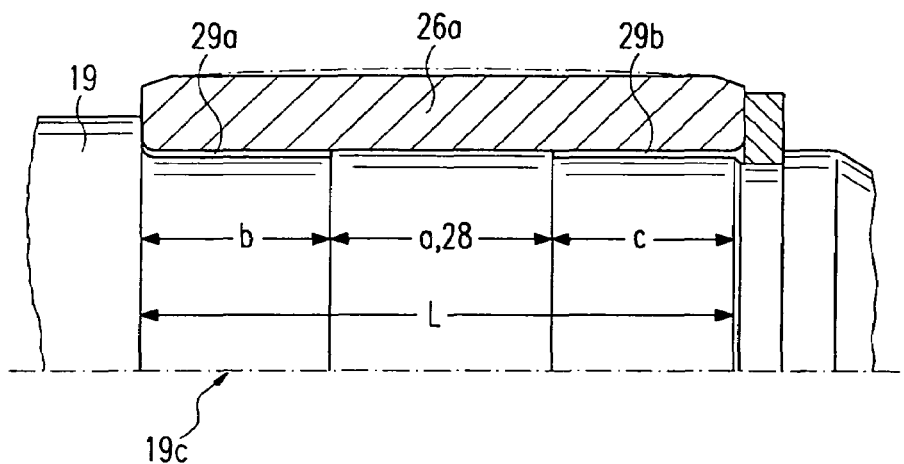

If the supporting region 28 is of cylindrical construction, slight compression stresses can occur with the bearing ring 26a can occur in the event of deflection of the drive shafts 19 in the supporting region 28, as a result of which the bearing ring 26a can be stretched outwards slightly in its central region, as FIG. 4 shows diagrammatically in chain-dotted lines.

Figure 5:
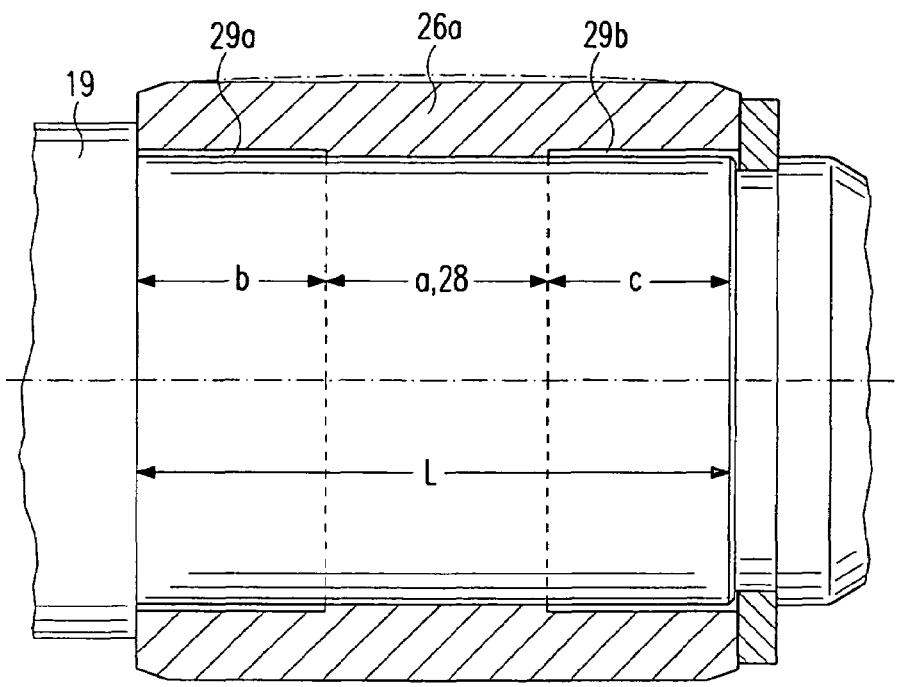
FIG. 5 shows a bearing section according to the invention with an inner bearing ring seated thereon, in a modified configuration.

The exemplified embodiment in accordance with FIG. 5, in which parts which are the same or comparable are provided with the same reference symbols, differs from the exemplified embodiment described above through the fact that it is not the bearing section 19c but the bearing ring 26a which has, in its central region a, the supporting region 28a, next to which in the outer regions b, c said bearing ring 26a is widened internally, either in a step-shaped manner or in a manner diverging towards its ends. This results, in each of the outer regions b, c, in radial play, or an annular clearance 29a, 29b, between the cylindrical superficies of the bearing section 19c and the outer regions b, c. In the event of deflection of the drive shaft 19, the end regions of the bearing section 19c are able to dip into these clearances 29a, 29b, with the advantages described above.

The invention claimed is:

1. Piston engine, with a housing in which a shaft is rotatably mounted in two pivot bearings, at least one said pivot bearing being a cylinder roller bearing having an inner race, a bearing section of said shaft having a supporting region on which a central portion of said inner race is seated in a radially tight fit therewith, the supporting region of the shaft having an axial length which corresponds to a central portion of the bearing section and forming at two opposite outer axial regions, an annular clearance between each of said outer regions and the inner race, said inner race being pre-stressed so as to assume a convex deformation in conjunction with the support thereof on the central portion of the bearing section.

2. Piston engine according to claim 1, wherein the bearing section of said shaft has a larger diameter in the central portion on which said inner race is seated than the diameters of the shaft that form the annular clearances with the opposite axial end regions of the inner race.

3. Piston engine according to claim 2, wherein the diameters of the shaft extending from the central bearing region are stepped down in size from the diameter of the central bearing region.

4. Piston engine according to claim 3, wherein the stepped diameters are narrowed cylindrically.

5. Piston engine according to claim 1, wherein the inner race has a smaller internal diameter in its central portion than the internal diameters of the opposite axial outer end regions thereof.

6. Piston engine according to claim 1, wherein the central supporting region between said inner race and said shaft is in the range of about ¼ to ½ the length (L) of the bearing section of said shaft.

7. Piston engine according to claim 1, wherein the central supporting region is of a cylindrical configuration.

8. Piston engine according to claim 1, wherein the cylinder roller bearing comprises a needle bearing.

* * * * *